United States Patent
Görtz et al.

(10) Patent No.: US 7,112,651 B2
(45) Date of Patent: Sep. 26, 2006

(54) PRODUCTION OF POLYOXYMETHYLENE AND SUITABLE CATALYSTS

(75) Inventors: Hans-Helmut Görtz, Freinsheim (DE); Gerrit Luinstra, Mannheim (DE); Monika Förster, Mühltal (DE); Andreas Baumann, Nürtingen (DE); Ekkehard Lindner, Tübingen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/510,475

(22) PCT Filed: Apr. 10, 2003

(86) PCT No.: PCT/EP03/03746

§ 371 (c)(1),
(2), (4) Date: Oct. 7, 2004

(87) PCT Pub. No.: WO03/085018

PCT Pub. Date: Oct. 16, 2003

(65) Prior Publication Data

US 2005/0176924 A1 Aug. 11, 2005

(30) Foreign Application Priority Data

Apr. 11, 2002 (DE) .................. 102 15 978

(51) Int. Cl.
*C08G 65/34* (2006.01)

(52) U.S. Cl. ...................... 528/425; 528/403; 528/485; 528/486

(58) Field of Classification Search ................ 528/425, 528/403, 485, 486
See application file for complete search history.

(56) References Cited

U.S. PATENT DOCUMENTS

| | | | |
|---|---|---|---|
| 3,305,529 A | 2/1967 | Reynolds |
| 3,457,227 A | 7/1969 | Kennedy |
| 3,506,615 A | 4/1970 | Chen |
| 3,804,808 A | 4/1974 | Ishii et al. |
| 5,089,536 A | 2/1992 | Palazzotto |

FOREIGN PATENT DOCUMENTS

| | | |
|---|---|---|
| GB | 1187233 | 4/1970 |
| WO | 94/09055 | 4/1994 |

*Primary Examiner*—Duc Truong
(74) *Attorney, Agent, or Firm*—Novak Druce & Quigg, LLP; Jason D.. Voight

(57) ABSTRACT

A process is described for preparing polyoxymethylene by contacting a formaldehyde source with a catalyst of the formula I $$[ML^1_a L^2_b]_c^{m+} Z_{c \cdot m/n}^{n-} \quad (I)$$

where
M is a metal of group VIII;
$L^1$ is a ligand having at least one π-electron pair;
each $L^2$ is independently tetrahydrofuran or a ligand which is displaceable by tetrahydrofuran;
Z is an anion;
a is 1 or 2;
b is an integer from 0 to 4;
c is 1 or 2; and
m and n are integers from 1 to 4.

9 Claims, No Drawings

PRODUCTION OF POLYOXYMETHYLENE AND SUITABLE CATALYSTS

The present invention relates to a process for preparing polyoxymethylene by contacting a formaldehyde source with a catalyst and a catalyst suitable therefor.

The polyoxymethylene resulting from the homopolymerization of formaldehyde is a polymer having repeating $CH_2O$ units. When formaldehyde is copolymerized with cyclic ethers or formals, the $CH_2O$ chains are interrupted by units which stem from the cyclic ethers or formals. The term polyoxymethylene is used hereinbelow both for the homo- and for the copolymer.

Polyoxymethylene and processes for preparing it by homo- or copolymerizing formaldehyde using metal complexes as catalysts are well known. For instance, WO 94/09055 describes the polymerization of cyclic ethers, such as trioxane, in the presence of a catalyst of the general formula $MZ_2Q_t$, where M is a metal, at least one Z is a perfluorinated alkylsulfonate and any further Z moieties present are each oxo or a monovalent monoanion, Q is a neutral ligand, s is from 2 to 5 and t is from 0 to 6. Specifically, the polymerization of trioxane in the presence of ytterbium triflate is described. However, the unsatisfactory yields even at long reaction times are disadvantageous.

U.S. Pat. No. 3,457,227 describes trioxane homopolymerization and copolymerization with cyclic ethers using a dioxomolybdenum acetylacetonate catalyst. A disadvantage is that the catalyst is easily deactivated by impurities or water traces in the trioxane. The trioxane used accordingly has to be very pure.

DE 2 226 620 describes the polymerization of formaldehyde using a copper acetylacetonate complex. This also requires virtually water-free formaldehyde.

U.S. Pat. No. 3,305,529 describes the homo- and copolymerization of formaldehyde in the presence of metal diketonates. However, the yields obtained are unsatisfactory for an industrial process.

BE 727 000 describes the homopolymerization of formaldehyde or trioxane and the copolymerization of cyclic formals with a catalyst which comprises titanyl acetylacetonate and iron(II) and/or iron(III) acetylacetonate. This also requires the monomers used to be substantially water-free.

The prior art processes have long induction times, in particular when the formaldehyde source is not highly pure. This may even lead to no polymerization occurring at all. The induction time is the time which elapses from the mixing of the formaldehyde source with the catalyst to the "light-off" of the polymerization. A long induction time leads to long residence times of reactants in the reactor which is uneconomical.

It is an object of the present invention to provide a process having a short induction time which is preferably tolerant toward impurities and water traces in the formaldehyde source. In particular, the catalyst used in the process shall be light and recyclable without substantial loss of activity.

We have found that this object is achieved by a process for preparing polyoxymethylene by contacting a formaldehyde source with a catalyst of the formula I

where

M is a metal of group VIII of the Periodic Table;
$L^1$ is a ligand having at least one π-electron pair;
$L^2$ is tetrahydrofuran or a ligand which is displaceable by tetrahydrofuran;
Z is an anion;
a is 1 or 2;
b is an integer from 0 to 4;
c is 1 or 2; and
m and n are integers from 1 to 4.

In formula I, M is preferably Co, Rh, Ir, Ni, Pd or Pt. M is more preferably Ir(III) or Pt(II).

$L^1$ is a ligand which has at least one π-electron pair capable of complexing, preferably at least two π-electron pairs capable of complexing. The ligand may be charged or uncharged. The π-electron pairs may be the π-contribution of an element-element double bond, preferably of a carbon-carbon double bond, or a free electron pair which is conjugated with at least one element-element double bond, for example in the allylic position to such a double bond, and preferably localized on a carbon atom. The useful $L^1$ ligands include olefins such as conjugated or nonconjugated, cyclic or open-chain dienes, for example butadiene, cyclopentadiene, cycloheptadiene or cyclooctadiene, trienes and tetraenes, aromatic compounds such as benzene and cyclically conjugated carbanions or carbocations having aromatic character, i.e. those which have 6 π-electrons or one cyclically conjugated system, such as the cyclobutene dianion, the cyclopentadienyl anion or the cycloheptatrienyl cation, and also the allyl anion.

The olefins mentioned, aromatic compounds (including the compounds having aromatic character) and the allyl anion may each carry substituents on one, more than one or all of their carbon atoms, such as in particular alkyl, alkenyl, aryl, heteroaryl, aralkyl, $COOR^2$, $COR^2$, CN or $NO_2$ where $R^2$ is H, alkyl, aryl or aralkyl.

For the purposes of the present invention, the term "alkyl" encompasses linear, branched and cyclic alkyl groups. These are preferably $C_1$–$C_{20}$-alkyl, in particular $C_1$–$C_6$-alkyl groups, such as methyl, ethyl, propyl, isopropyl, n-butyl, 2-butyl, isobutyl, tert-butyl, n-pentyl and n-hexyl, or $C_3$–$C_8$-cycloalkyl, such as cyclopropyl, cyclopentyl, cyclohexyl or cycloheptyl.

Aryl is preferably $C_6$–$C_{14}$-aryl, such as phenyl, naphthyl, anthracenyl or phenanthrenyl and in particular phenyl or naphthyl. The aryl radicals may carry up to three $C_1$–$C_4$-alkyl radicals.

Heteroaryl is preferably a radical of a 5- or 6-membered heteroaromatic having from 1 to 5 heteroatoms selected from N, O and S, such as pyrrole, furan, thiophene, pyrazole, oxazole, pyridine, pyrimidine, pyridazine or pyrazine. The heteroaryl radicals may be benzofused along one or two bonds.

Aralkyl is preferably $C_7$–$C_{20}$-aralkyl, such as benzyl or phenylethyl.

The term "alkenyl" encompasses linear, branched and cyclic alkenyl groups. These are preferably $C_2$–$C_{20}$-alkenyl groups, in particular $C_2$–$C_6$-alkenyl groups, such as ethenyl, propenyl, isopropenyl, n-butenyl, isobutenyl, n-pentenyl and n-hexenyl, or $C_5$–$C_8$-cycloalkenyl, such as cyclopentenyl, cyclohexenyl, cycloheptenyl or cyclooctenyl.

Preferred $L^1$ ligands are cyclic dienes which may be substituted as stated, and particular preference is given to cyclooctadiene and cyclopentadienyl anions of the formula $C_5H_{(5-u)}R^1_u$ where u is an integer from 0 to 5 and each $R^1$ is independently one of the substituents stated above. A particularly suitable cyclopentadienyl anion is the pentamethylcyclopentadienyl anion.

The $L^2$ ligands are tetrahydrofuran (THF) or a ligand which, owing to the high affinity of THF for the central atom, is displaceable from the coordination sphere of a complex by THF. The displaceability of a ligand by another coordinates generally with their positions in the spectrochemical series of ligands, so that useful $L^2$ ligands are those which lead to a smaller ligand field splitting than THF. A ligand is regarded as displaceable by THF when it has been displaced from a complex by heating the complex in THF to boiling. A suitable model system which can be used to study the displaceability of a ligand by THF is dichlorohexakis-(ethanol) nickel(II). This is firstly reacted with the ligand to be tested to convert it into a complex which contains at least one molecule of this ligand in coordinatively bound form. It is generally sufficient to stir the dichlorohexakis(ethanol)-nickel (II) with an excess of ligand to be tested in ethanol at room temperature. The complex obtained may then be isolated and heated as described in THF to boiling. A ligand is regarded as displaceable by THF when at least one molecule is displaced by THF from a complex which contains more than one molecule of a ligand. The $L^2$ ligands are preferably neutral. When c is 1 in the catalyst used according to the invention, b is preferably not 0.

Preference is given to selecting $L^2$ from nitriles, CO, alkenes, amines displaceable by THF, ethers displaceable by THF, carboxylic esters, cyclic carbonic esters, epoxides, hemiacetals, acetals and nitro compounds.

The term "nitrile" encompasses in particular compounds of the general formula $R^3CN$, where $R^3$ is an optionally halogenated alkyl, aryl or aralkyl radical. $R^3$ is more preferably methyl, ethyl, propyl, isopropyl, n-butyl, isobutyl, sec-butyl or tert-butyl.

Examples of useful nitriles include acetonitrile, propionitrile and benzonitrile.

Amines displaceable by THF are in particular aromatic amines and amines having a sterically shielded nitrogen atom. Examples of useful amines include diisopropylamine, N,N-dimethylaniline and diphenylamine.

Ethers displaceable by THF are in particular both open-chain ethers having electron-withdrawing and/or sterically demanding radicals and also cyclic ethers. The preferred open-chain ethers include diphenyl ether and methyl tert-butyl ether. Preferred cyclic ethers are tetrahydrofuran and 1,4-dioxane.

Carboxylic esters encompass in particular compounds of the general formula $R^4COOR^5$, where $R^4$ and $R^5$ are each independently as defined for $R^3$. $R^4$ may also be H. $R^4$ and $R^5$ may also form a bridging unit. $R^4$ and $R^5$ are preferably each independently methyl, ethyl, propyl, isopropyl, n-butyl or phenyl. Examples of useful carboxylic esters include methyl acetate and ethyl acetate.

Cyclic carbonic esters encompass in particular compounds of the general formula $R^6OCOOR^7$ where $R^6$ and $R^7$ together form a $C_2$–$C_4$-alkylene bridge which may be partly or fully halogenated or carry from 1 to 4 alkyl radicals. Examples of useful cyclic carbonic esters include ethylene carbonate and propylene carbonate.

Epoxides encompass in particular compounds of the general formula

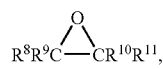

where $R^8$, $R^9$, $R^{10}$ and $R^{11}$ are each independently as defined for $R^3$ or are H.

Examples of useful epoxides include ethylene oxide, propylene oxide and butylene oxide.

Hemiacetals and acetals encompass in particular compounds of the general formula $R^{12}OCR^{13}R^{14}OH$ and $R^{12}OCR^{13}R^{14}OR^{15}$, where $R^{12}$, $R^{13}$, $R^{14}$ and $R^{15}$ are each independently as defined for $R^3$, and $R^{13}$ and $R^{14}$ may also be H or together form a $C_2$–$C_7$-alkylene bridge, and $R^{12}$ and $R^{15}$ may also form a $C_2$–$C_4$-alkylene bridge which may be interrupted by one or two oxygen atoms. Examples of useful acetals include trioxane, 1,3-dioxane, 1,3-dioxepane and cyclopentanone dimethylacetal.

Nitro compounds encompass compounds of the general formula $R^{16}NO_2$, were $R^{16}$ is as defined for $R^3$. Examples of useful nitro compounds include nitromethane and nitrobenzene.

Particular preference is given to selecting the ligands $L^2$ from THF and CO.

Z is one or more anions which may be identical or different. Each Z is preferably an anion derived from a Brönsted acid whose $pK_a$ is smaller than that of acetic acid or a noncoordinating anion. The term "noncoordinating anion" is known to those skilled in the art. These are anions where the charge is effectively distributed over more than one atom so that there are no point-centered charges. Z is more preferably a halide, in particular chloride, a sulfonate of the general formula $ROSO_2$—, where R is alkyl, partly or fully halogenated alkyl or aryl, such as trifluoromethanesulfonate, benzenesulfonate or p-toluenesulfonate, a carboxylate of the general formula $R'COO$—, where R' is as defined for R and more preferably fully halogenated alkyl, in particular perfluorinated alkyl, such as trifluoroacetate, a complexed borate such as tetrafluoroborate or tetraphenylborate, a complexed phosphate such as hexafluoro-phosphate, a complexed arsenate such as hexafluoroarsenate or a complexed antimonate such as hexafluoro- or hexachloroantimonate, with the proviso that not all Z radicals may be halide. In particular, at least one Z radical is perfluoroalkylsulfonate such as trifluoromethanesulfonate, tetrafluoroborate, hexafluorophosphate or hexafluoroantimonate.

b is an integer from 0 to 4 and depends on the maximum possible coordination number of the central metal.

c is 1 or 2, i.e. the complex I may be either mononuclear or binuclear. The two metal centers in a binuclear complex are bridged by at least one, preferably at least two bridges which are formed by $L^2$ and/or Z.

m is an integer from 1 to 4 and results from the sum total of the oxidation number of M and the charges of the $L^1$ and $L^2$ ligands. n is the charge of the anion Z.

Preferred catalysts are

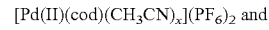

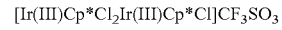

where cod is cyclooctadiene,

THF is tetrahydrofuran,

Cp* is pentamethylcyclopentadienyl and x is an integer from 1 to 3.

The catalyst I is preferably used in a quantity of from 1 ppm to 1 mol %, more preferably from 5 to 1000 ppm and in particular from 50 to 500 ppm, based on the formaldehyde source.

Preference is given to preparing the catalyst I before use in the polymerization. The catalyst is prepared by customary processes for preparing such metal complexes and the preparation is familiar to those skilled in the art.

The formaldehyde source used is preferably formaldehyde, trioxane, tetraoxane or paraformaldehyde or a mixture thereof, and more preferably formaldehyde or trioxane or a mixture thereof. Trioxane, the cyclic trimer of formaldehyde, and paraformaldehyde, an oligomer having from 2 to 100 formaldehyde units, are either depolymerized before use in the polymerization reaction or preferably used as such and dissociated in the course of the reaction.

The formaldehyde source preferably has a degree of purity of at least 95%, more preferably at least 98% and most preferably at least 99%. In particular, the formaldehyde source contains a maximum of 0.002% by weight of compounds having active hydrogen such as water, methanol or formic acid, based on the weight of the formaldehyde source. However, the process according to the invention also tolerates formaldehyde sources having a lower degree of purity and a higher content of compounds having active hydrogen.

The process according to the invention may be carried out as a solution, suspension, gas phase or bulk polymerization.

When the polymerization is carried out in solution or suspension, it is advantageous to select a substantially anhydrous aprotic organic reaction medium which is liquid under the reaction conditions and reacts neither with the catalyst nor with the formaldehyde source. When the polymerization is carried out in solution, the solvent should advantageously also dissolve the catalyst and the formaldehyde source but preferably not dissolve or only sparingly dissolve the polyoxymethylene formed. When the polymerization is carried out in suspension, the formaldehyde source should also be insoluble in the solvent and, if necessary, dispersion auxiliaries are used, in order to achieve better distribution of the formaldehyde source in the reaction medium.

Preference is given to selecting the solvent from saturated or unsaturated, linear or branched, aliphatic hydrocarbons which may be partly or fully halogenated, optionally substituted alicycles, optionally substituted fused alicycles, optionally substituted aromatics, acyclic and cyclic ethers, polyether polyols and other polar aprotic solvents such as sulfoxides and carboxylic acid derivatives.

Examples of useful aliphatic hydrocarbons include propane, n-butane, n-pentane, n-hexane, n-heptane, n-decane and mixtures thereof. Examples of useful halogenated hydrocarbons include methylene chloride, chloroform, carbon tetrachloride, dichloroethane or trichloroethane. Useful aromatics include benzene, toluene, the xylenes, nitrobenzene, chlorobenzene, dichlorobenzene and biphenyl. Useful alicycles include cyclopentane, cyclohexane, tetralin and decahydronaphthalene. Examples of useful acyclic ethers include diethyl ether, dipropyl ether, diisopropyl ether, dibutyl ether and butyl methyl ether; useful cyclic ethers include tetrahydrofuran and dioxane. Examples of the useful polyether polyols include dimethoxyethane and diethylene glycol. An example of a useful sulfoxide is dimethyl sulfoxide. The useful carboxylic acid derivatives include dimethylformamide, ethyl acetate, acetonitrile, acrylate and ethylene carbonate.

Particularly preferred solvents for the solution polymerization are selected from the following: n-hexane, cyclohexane, methylene chloride, chloroform, dichloroethane, trichloroethane, tetrachloroethane, benzene, toluene, nitrobenzene, chlorobenzene, dichlorobenzene, tetrahydrofuran and acetonitrile. All mixtures thereof are also suitable. In particular, 1,2-dichloethane or 1,2-dichloroethane are used in a mixture with hexane, cyclohexane or benzene.

Preference is given to using the formaldehyde source in the solution polymerization in a concentration of from 20 to 90% by weight, preferably from 30 to 80% by weight, based on the total weight of the solution. The polymerization in solution may also be carried out as a "blow-in" polymerization. This involves continuously blowing the formaldehyde source, in particular formaldehyde gas, into a solution which contains the catalyst.

Preferred reaction media for the heterogeneous suspension polymerization include straight-chain aliphatic hydrocarbons.

The polymerization may also be carried out in bulk when trioxane is used as the formaldehyde source. Trioxane is used as a melt; the reaction temperature and reaction pressure are selected correspondingly.

In the process according to the invention, the sequence in which the formaldehyde source and the catalyst I introduced into the reaction zone is not of decisive importance. However, preference is given to initially charging the formaldehyde source and adding the catalyst to it.

The polymerization is preferably carried out at a temperature of from −40 to 150° C., more preferably from 0 to 150° C. The solution polymerization and suspension polymerization are carried out in particular at from 20 to 100° C. and especially from 30 to 90° C. The bulk polymerization is preferably carried out at such a temperature that the formaldehyde source, especially trioxane, and the polymer are in the form of a melt. In particular, the temperature, depending on the pressure, is from 60 to 120° C., especially from 60 to 100° C.

The reaction pressure is preferably from 0.1 to 50 bar, more preferably from 0.5 to 10 bar and in particular from 1 to 5 bar.

Useful reaction apparatus includes the reactors which are known to the skilled in the art for the type and conditions of each different polymerization.

The above remarks apply both to the homopolymerization of the formaldehyde source and to the copolymerization of the formaldehyde source with cyclic ethers or formals which will be referred to hereinbelow as comonomers.

Homopolymeric polyoxymethylene tends to thermally degrade, i.e. to depolymerize to oligomeric or monomeric formaldehyde. This is attributed to the presence of hemiacetal functions at the chain ends of the polyoxymethylene. Copolymerization of formaldehyde with comonomers such as cyclic ethers and/or formals can stabilize the polyoxymethylene formed. These comonomers are incorporated in the polyoxymethylene chain. When the polymer is subjected to thermal stress, the polyoxymethylene chain degrades until the chain end is formed by one of the abovementioned comonomers. These are substantially less prone to thermally degrade, so that the depolymerization comes to a stop and the polymer is stabilized. Useful comonomers of this type are cyclic ethers, in particular those of the formula

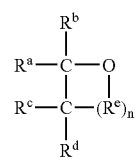

where $R^a$, $R^b$, $R^c$ and $R^d$ are each independently hydrogen or an optionally halogenated $C_1$–$C_4$-alkyl group, $R^e$ is a —$CH_2$—, —$CH_2O$—, a $C_1$–$C_4$-alkyl- or $C_1$–$C_4$-haloalkyl-substituted methylene group or a corresponding oxymethylene group and n is an integer from 0 to 3.

Cyclic ethers mentioned only by way of example include ethylene oxide, 1,2-propylene oxide, 1,2-butylene oxide, 1,3-butylene oxide, 1,3-dioxane, 1,3-dioxolane and 1,3-dioxepane, and comonomers mentioned only by way of example include linear oligo- and polyformals such as polydioxolane and polydioxepane.

When they are used, repeat units of the formula

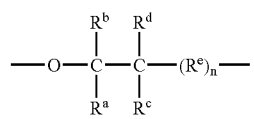

are incorporated into the polyoxymethylene copolymers obtained in addition to the —CH₂O— repeat units stemming from the formaldehyde source.

If desired, a third monomer may be used in addition to the above-described cyclic ethers, preferably a bifunctional compound of the formula

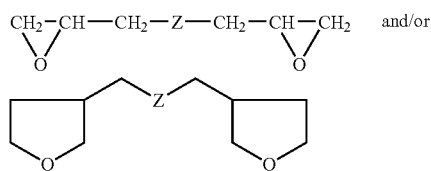 and/or where Z is a chemical bond, —O—, —ORO— (R=$C_1$-$C_8$-alkylene or $C_2$-$C_8$-cycloalkylene).

To name only a few examples, preferred monomers of this type include ethylene diglycide, diglycidyl ethers and diethers made from glycidylene and formaldehyde, dioxane or trioxane in a molar ratio of 2:1 and also diethers made from 2 mol of glycidyl compound and 1 mol of an aliphatic diol having from 2 to 8 carbon atoms, for example the diglycidyl ethers of ethylene glycol, 1,4-butanediol, 1,3-butanediol, cyclobutane-1,3-diol, 1,2-propanediol and cyclohexane-1,4-diol.

Particular preference is given to using ethylene oxide, 1,2-propylene oxide, tetrahydrofuran, 1,3-dioxane, 1,4-dioxane, 1,3-dioxolane and 1,3-dioxepane, in particular 1,3-dioxepane as comonomers.

The comonomers are preferably used in a quantity of from 0.1 to 40% by weight, more preferably from 0.2 to 10% by weight, in particular from 0.5 to 5% by weight, based on the formaldehyde contained in the formaldehyde source.

The comonomers may either be initially charged with the formaldehyde source or added to the additionally charged catalyst together with the formaldehyde source. Alternatively, they may be added to the reaction mixture consisting of the formaldehyde source and the catalyst.

When cyclic ethers are used as comonomers, there is a risk that these contain peroxides, in particular when they have been stored for a relatively long time before use. Peroxides firstly lengthen the induction time of the polymerization and secondly reduce the thermal stability of the polyoxymethylene formed owing to their oxidative effect. For this reason, preference is given to using cyclic ethers which contain less than 0.0015% by weight, more preferably less than 0.0005% by weight, of peroxides, reported as hydrogen peroxide and based on the quantity of cyclic ether used.

In order to prevent oxidative degradation of the polyoxymethylenes obtained, preference is given to adding sterically hindered phenol antioxidants to them. In principle, useful sterically hindered phenols include all compounds having a phenolic structure which have at least one sterically demanding group on the phenolic ring.

Preference is given to using, for example, compounds of the formula

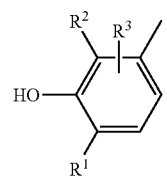

where $R^1$ and $R^2$ are identical or different and are each an alkyl group, a substituted alkyl group or a substituted triazole group and $R^3$ is an alkyl group, a substituted alkyl group, an alkoxy group or a substituted amino group.

Antioxidants of the type mentioned are described, for example, in DE-A 27 02 661 (U.S. Pat. No. 4,360,617).

A further group of preferred sterically hindered phenols is derived from substituted benzenecarboxylic acids, in particular from substituted benzenepropionic acids.

Particularly preferred compounds from this class are compounds of the formula

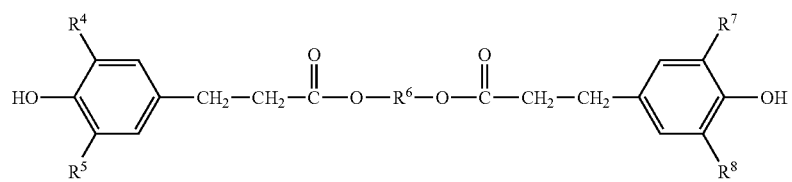

where $R^4$, $R^5$, $R^7$ and $R^8$ are each independently $C_1$-$C_8$-alkyl groups which may themselves be substituted (at least one of them is a sterically demanding group) and $R^6$ is a bivalent aliphatic radical having from 1 to 10 carbon atoms which may also have C—O-bonds in the main chain.

Preferred compounds of this type are

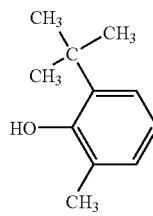 —CH₂—CH₂—C(=O)—O—CH₂—CH₂—O—CH₂—CH₂—O—CH₂—CH₂—O—C(=O)—CH₂—CH₂— 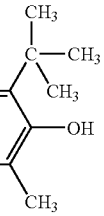

(Irganox® 245 from Ciba-Geigy)

and

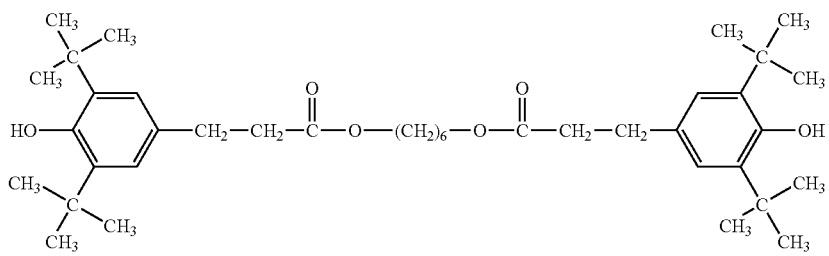

(Irganox® 259 from Ciba-Geigy)

Examples of sterically hindered phenols include:
2,2'-methylene-bis(4-methyl-6-tert-butylphenol),
1,6-hexanediolbis[3-(3,5-di-tert-butyl-4-hydroxyphenyl)-propionate] (Irganox® 259), pentaerythrityl tetrakis[3-(3,5-di-tert-butyl-4-hydroxyphenyl)propionate] and the above-described Irganox® 245

The following compounds have proven to be particularly effective and are therefore used with preference:
2,2'-methylene-bis(4-methyl-6-tert-butylphenol),
1,6-hexanediolbis[3-(3,5-di-tert-butyl-4-hydroxyphenyl)-propionate] (Irganox® 259), pentaerythrityl tetrakis[3-(3,5-di-tert-butyl-4-hydroxyphenyl)propionate], distearyl 3,5-di-tert-butyl-4-hydroxybenzylphosphonate,
2,6,7-trioxa-1-phosphabicyclo[2.2.2]oct-4-yl-methyl 3,5-di-tert-butyl-4-hydroxycinnamate,
3,5-di-tert-butyl-4-hydroxyphenyl-3,5-distearyl-thiotriazy-lamine,
2-(2'-hydroxy-3'-hydroxy-3',5'-di-tert-butylphenyl)-5-chloro-benzotriazole, 2,6-di-tert-butyl-4-hydroxymeth-ylphenol,
1,3,5-trimethyl-2,4,6-tris-(3,5-di-tert-butyl-4-hydroxyben-zyl) benzene, 4,4'-methylene-bis(2,6-di-tert-butylphenol),
3,5-di-tert-butyl-4-hydroxybenzyldimethylamine and
N,N'-hexamethylene-bis-3,5-di-tert-butyl-4-hydroxyhydro-cinnamide.

The sterically hindered phenols which may be used individually or as a mixture may either be added to the monomer mixture or to the finished polymer. In the latter case, the polymer may optionally be melted in order to achieve better dispersion of the antioxidant.

Preference is given to using the antioxidants in a quantity of up to 2% by weight, more preferably from 0.001 to 2% by weight, in particular from 0.005 to 1% by weight, based on the weight of monomer mixture used or polymer obtained.

Another possible way of stabilizing the polyoxymethylene obtained by homopolymerization of a formaldehyde source is to cap the hemiacetal end groups. i.e. convert them to functionalities which do not tend to thermally degrade. To this end, the polyoxymethylene is reacted, for example, with carboxylic acids, carbonyl halides, carboxylic anhydrides, carbonates or hemiacetals, or cyanethylated.

In this variant, the polyoxymethylene is stabilized in a separate step following the polymerization. Preference is accordingly given to stabilizing the polyoxymethylene by copolymerization with the comonomers which requires no separate step.

After the end of the polymerization reaction, preference is given to admixing the catalyst with a deactivator. Useful deactivators include ammonia, aliphatic and aromatic amines, alcohols, basic salts such as alkaline metal and alkaline earth metal hydroxides and carbonates or borax, and also water. The deactivated catalyst and the deactivator are then separated from the polymer, preferably by washing with water or an organic solvent such as acetone or methylene chloride. However, since the catalyst I may also be used in very small quantities, subsequent treatment of the polyoxymethylene to remove the catalyst may optionally also be omitted.

After the end of the polymerization reaction, excess monomer which is still present in the reaction zone may be removed, for example, by distillation, by purging with a gas stream, for example air or nitrogen, by degassing, by solvent extraction or by washing with an aqueous mixture or with an organic solvent such as acetone.

The polyoxymethylene is generally recovered by removing the solvent or, in the case of bulk polymerization, by cooling and optionally chipping the melt. A preferred workup for bulk polymerization comprises the discharge, cooling and chipping of the polymer melt at elevated pressure and in the presence of a liquid, in particular of water, and is described in German patent application DE-A-100 06 037 which is fully incorporated herein by way of reference.

In the process according to the invention, induction times are obtained which are in the optimal range for industrial applications of from a few seconds to a few minutes. At the same time, the catalyst quantity required is small. The polyoxymethylene preparable according to the invention preferably has a number average molar mass $M_N$ of from 5 000 to 50 000 g/mol, more preferably from 10 000 to 30 000 g/mol. The weight average molar mass is preferably from 10 000 to 300 000 g/mol, more preferably from 15 000 to 250 000 g/mol. The polydispersity index PDI ($M_W/M_N$) is preferably from 1.0 to 10.

The catalysts of the formula I used in the process according to the invention are insensitive toward water present in the formaldehyde source and may easily be recycled without substantial losses of activity.

The invention is illustrated by the examples hereinbelow.

EXAMPLES

1. Preparation of the Catalysts

The catalysts were prepared under protective gas.

1.1 $[Pd(II)(cod)(THF)_x](SbF_6)_2$ 20 mg (0.07 mmol) of $PdCl_2(cod)$ were suspended in 2 ml of anhydrous THF. The suspension was suspended in a solution of 48 mg (0.14 mmol) of $AgSbF_6$ in 2 ml of anhydrous THF and 0.1 ml of anhydrous acetonitrile. The mixture was stirred in the dark for 1 h and then precipitated AgCl was centrifuged off. After distillative removal of the solvent, the product was obtained as an orange-yellow oil.

1.2 [Ir(III)Cp*Cl$_2$Ir(III)Cp*Cl]CF$_3$SO$_3$

A solution of 46 mg (0.207 mmol) of trimethylsilyl trifluoromethanesulfonate in 5 ml of dichloromethane was added to a solution of 150 mg (0.188 mmol) of [IrCp*Cl$_2$]$_2$ in 20 ml of dichloromethane at room temperature. After the reaction mixture had been stirred for 1 day, the mixture was evaporated to dryness and the yellow residue washed with hexane. The product was obtained in a yield of 161 mg (0.177 mmol; 94% of theory) as a yellow powder.

2. Polymerization

The polymerizations were effected without protective gas.

2.1 Polymerization using [Ir(III)Cp*Cl$_2$Ir(III)Cp*Cl](CF$_3$SO$_3$)

2.1.1 Preparation of the Catalyst Solution

[Ir(III)Cp*Cl$_2$Ir(III)Cp*Cl](CF$_3$SO$_3$) is dissolved in the quantities stated in the individual experiments in a Schlenk flask in 1 ml of dichloromethane. This solution is kept ready for the polymerization.

2.1.2 Polymerization 6 ml of liquid, distilled trioxane were admixed with 1 ml of the catalyst solution prepared in 2.1.1 ($\hat{=}$7.7 μmol of catalyst) at 80° C. with stirring. The time from the addition of the catalyst solution and the onset of cloudiness, i.e. the induction time, was 60 s. After 120 min, the polymer formed was filtered off, washed with a little dichloromethane and dried. The yield was 4.48 g (68% of theory). The polymer had an $M_n$ of 21 300 g/mol, an $M_w$ of 69 800 g/mol and a PDI of 3.27.

2.1.3 Polymerization with Reuse of the Catalyst Solution from 2.1.2

The polymer filtrate from 2.1.2 was made up to a volume of 1 ml using dichloromethane and used again for polymerization as described in 2.1.2 instead of the catalyst solution prepared according to 2.1.1. The induction time was 10 s. The polymer was obtained in a yield of 80% with an $M_n$ of 25 500 g/mol, an $M_w$ of 30 000 g/mol and a PDI of 1.2.

2.1.4 Polymerization in the Presence of Water

A from 40 to 50% solution of trioxane in dichloroethane saturated with formalin was mixed with 3% by volume of 1,3-dioxepane. 6 ml of this solution were admixed at 80° C. with 6.3 mg (6.9 μmol) of [Ir(III)Cp*Cl$_2$Ir(III)Cp*Cl]CF$_3$SO$_3$ in 1 ml of dichloromethane. The induction time was 25 min. After 1 h, a further 12 ml of the trioxane solution were added and the mixture stirred for a further 15 h. The resulting polymer was recovered by filtration in a yield of 10.3 g (76% of theory) having an $M_n$ of 6 200 g/mol, an $M_w$ of 15 000 g/mol and a PDI of 2.41.

2.2 Polymerization Using [Pd(II)(cod)(THF)$_x$](SbF$_6$)$_2$

A solution of 0.025 mmol of [Pd(II)(cod)(THF)$_x$](SbF$_6$)$_2$ in 1 ml of dichloroethane was added to 6 ml of the trioxane solution described in 2.1.4 at 80° C. with stirring. The induction time was 70 S. After 30 min, a further 6 ml of the trioxane solution was added and the induction time was this time 5 min. The resulting polymer was isolated by means of filtration in a yield of 6.25 g (91% of theory) having an $M_n$ of 12 500 g/mol, an $M_w$ of 30 400 g/mol and a PDI of 2.42.

2.3 Comparative Experiments: Polymerization Using MoO$_2$(acac)$_2$

2.3.1 Polymerization of Anhydrous Trioxane 6 ml of freshly distilled trioxane were admixed with a solution of 3 mg (9.15 μmol) of MoO$_2$(acac)$_2$ in 1 ml of dichloromethane at 80° C. with stirring. The time from the addition of the catalyst solution to the onset of cloudiness, i.e. the induction time, was 5.5 min. After 4 h, the polymer was filtered off, washed with a little dichloromethane and dried. The yield was 6.2 g (94% of theory), the $M_n$ 11 500 g/mol, the $M_w$ 28 400 g/mol and the PDI 2.48.

2.3.2 Polymerization in the Presence of Water

A solution of 9.5 mg (29 μmol) of MoO$_2$(acac)$_2$ in 1 ml of dichloromethane was added to 6 ml of the trioxane solution described in 2.1.4 at 80° C. with stirring. After 2 h, there was still no polymerization. The reaction was stopped.

We claim:

1. A process for preparing polyoxymethylene by contacting a formaldehyde source with a catalyst of the formula I $$[ML^1{}_aL^2{}_b]_c{}^{m+}Z_{c\cdot m/n}{}^{n-} \quad (I)$$

where
M is a metal of group VIII;
L$^1$ is cyclooctadiene;
each L$^2$ is independently tetrahydrofuran or a ligand which is displaceable by tetrahydrofuran;
Z is an anion;
a is 1 or 2;
b is an integer from 0 to 4;
c is 1 or 2; and
m and n are integers from 1 to 4.

2. A process as claimed in claim 1 where M is Co, Rh, Ir, Ni, Pd or Pt.

3. A process as claimed in claim 1 where L$^2$ is selected from tetrahydrofuran, nitriles, CO, alkenes, amines, ethers, carboxylic esters, cyclic carbonic esters, epoxides, hemiacetals, acetals and nitro compounds.

4. A process as claimed in claim 3 where L$^2$ is selected from acetonitrile, tetrahydrofuran and CO.

5. A process as claimed in claim 1 where Z is a halide, sulfonate of the formula OSO$_2$R, where R is alkyl, partially or fully halogenated alkyl or aryl, carboxylate, complexed borate, complexed phosphate, complexed arsenate or complexed antimonate, with the proviso that not all Z radicals are halide.

6. A process as claimed in claim 5 wherein at least one Z radical is a perfluoroalkylsulfonate, tetrafluoroborate, hexafluorophosphate or hexafluoroantimonate.

7. A process as claimed in claim 1 where the catalyst is selected from

[Pd(II)(cod)(THF)$_x$](SbF$_6$)$_2$ and

[Pd(II)(cod)(CH$_3$CN)$_x$](PF$_6$)$_2$ where
cod is cyclooctadiene,
THF is tetrahydrofuran and
x is an integer from 1 to 3.

8. A process as claimed in claim 1 where the formaldehyde source is formaldehyde, trioxane or paraformaldehyde.

9. A process for preparing polyoxymethylene by contacting a formaldehyde source with a catalyst of the formula

[Ir(III)Cp*Cl$_2$Ir(III)Cp*Cl]CF$_3$SO$_3$ where
Cp* is pentamethylcyclopentadienyl.

* * * * *